United States Patent [19]

Tybus et al.

[11] 3,929,700

[45] Dec. 30, 1975

[54] POLYVINYL CHLORIDE COMPOSITION

[75] Inventors: Axel W. Tybus, New York; Leonard A. Fabrizio, North Bellmore, both of N.Y.

[73] Assignee: Hooker Chemicals & Plastics Corporation, Niagara Falls, N.Y.

[22] Filed: Apr. 29, 1974

[21] Appl. No.: 465,403

[52] U.S. Cl. .......................... 260/23 XA; 260/31.8
[51] Int. Cl.² ........................................ C08L 91/00
[58] Field of Search ................. 260/23 XA, 31.8 M

[56] References Cited

UNITED STATES PATENTS

| | | | |
|---|---|---|---|
| 3,046,237 | 7/1962 | Rosenfelder | 260/23 |
| 3,075,940 | 1/1963 | Pazinski | 260/31.8 |
| 3,218,289 | 11/1965 | Rowland | 260/31.8 |
| 3,277,042 | 10/1966 | Richard | 260/31.8 |
| 3,313,760 | 4/1967 | Barnes | 260/31.8 |
| 3,670,056 | 6/1972 | Helberger | 260/23 XA |
| 3,678,133 | 7/1972 | Ryan | 260/23 XA |

OTHER PUBLICATIONS

Matthews, G. "Vinyl and Allied Polymers" Vol. 2, CRC Press, (1972), pp. 73–81, 87–92, 117–119, 129 and 130.

Penn, W. S., "PRC Technology," 1966, pp. 48–52, 156, 186 and 187.

Sarvetnick, H. A., "Polyvinyl Chloride" 1969, pp. 67–71, and 88–100.

*Primary Examiner*—Donald E. Czaja
*Assistant Examiner*—William E. Parker
*Attorney, Agent, or Firm*—Peter F. Casella; James F. Mudd

[57] ABSTRACT

A polyvinyl chloride composition comprising per 100 parts by weight of polyvinyl chloride, about 7.5 to 8.5 parts of a polyvinyl chloride plasticizer, about 10 to 14 parts of an impact-modifier, about 1.5 to 2.1 parts of a processing aid, and about 1¼ to 2 parts of at least one lubricant. The composition is preferably stabilized with a total of about 6 and 9 parts of stabilizer and stabilizer booster combination. The composition is formable at temperatures above about 130°F and is a shape-retaining solid at ambient temperature, i.e., room temperature.

20 Claims, No Drawings

POLYVINYL CHLORIDE COMPOSITION

This invention provides polyvinyl chloride compositions having desirable properties.

SUBJECT MATTER OF THE INVENTION

The present invention provides improved polyvinyl chloride compositions containing about 7.5 to 8.5 (preferably about 8) parts of a plasticizer per 100 parts of polyvinyl chloride, about 10 to 14 parts of an impact modifier and about 1.5 to 2.1 parts of a processing aid. The compositions also contain about 1¼ to 2 parts of lubricants, and about 6 to 9 parts of polyvinyl chloride stabilizers and stabilizer boosters, which preferably comprise about 0.8 to 1.1 parts stabilizer and about 5 to 8 parts of stabilizer booster. The stabilizers and stabilizer boosters are preferably in an amount of about 6 to 7.5 parts. The compositions usually also contain pigments in an amount up to about 5 parts. All the foregoing proportions are expressed per 100 parts by weight of polyvinyl chloride.

The polyvinyl chloride is preferably a polymer having a number average molecular weight of about 20,000 to 23,000.

The plasticizers are those plasticizers used for polyvinyl chloride resins. The preferred plasticizers are the phthalates, e.g., di(2-ethylhexyl) phthalate also commonly referred to as dioctyl phthalate, and such other phthalates as di-butyl phthalate, butyl decyl phthalate, and the like. The di(2-ethylhexyl) phthalate is particularly preferred. Other useful plasticizers include the phosphates such as tri-2-ethylhexyl phosphate, tricresyl phosphate; the adipates, e.g., di-butyl adipate, di-hexyl adipate, dioctyl adipate; and the corresponding sebecates, and the like. The preferred compositions contain di(2-ethylhexyl) phthalate, preferably in an amount of about 8 parts, per 100 of polyvinyl chloride.

The impact modifiers are methylmethacrylate-butadiene-styrene type polymers, and acrylonitrile-butadiene-styrene type polymers; the former being preferred.

The impact modifiers are preferably used in an amount of 12 parts.

Polyvinyl chloride processing aids are used in an amount of between about 1.5 and 2.1 parts, and preferably in an amount of about 1.8 parts. The preferred processing aid is an acrylic-type polymer, such as those marketed under the trade designations Rohm & Haas K-120 N and Kanegafuchi PA 20.

The stabilizers are those known to stabilize polyvinyl chloride against heat and light degradation. These include the metal salts of fatty acids and particularly those of calcium, zinc, tin, barium and magnesium, and the di-organo-tin compounds. The preferred stabilizers are those stabilizers sanctioned for use in food packaging applications by the Food and Drug Administration and include the stearates and certain dioctyl tin (IV) compounds including dioctyl tin bis-iso-octyl mercaptoacetate, and the like. The preferred stabilizer combination consists of calcium stearate, zinc stearate, and stannous stearate. The amount of the combination of said three stabilizers is about 0.8 to 1.1 parts. The preferred amount of said stabilizers is about 1 part per 100 parts polyvinyl chloride.

The polyvinyl chloride stabilizer boosters include phosphites, epoxidized oils, and polyvinyl alcohol. The di- and tri(nonylphenyl) phosphites, epoxidized oils (particularly epoxidized soybean oil), and polyvinyl alcohol are preferred. The stabilizer boosters are preferably in an amount of about 5 and 6.5 parts.

These polyvinyl chloride compositions are capable of being formed into sheet material (as described hereinafter), e.g., plastic sheet between 50 and 120 mils thick, having the following properties: a tensile strength at yield of between 2,000 and 10,000 psi, and elongation at yield of between 3% and 30%, a flexural strength of between 3,000 and 14,000 psi, a flexural modulus of between about $0.5 \times 10^5$ and $7 \times 10^5$ psi, a notched Izod of between 0.3 and 30 foot pounds per inch, a Rockwell hardness of between 15 on the R scale and 55 on the D scale; and a Vicat softening point of between 60°C and 80°C.

Polyvinyl chloride homopolymer and impact modifier copolymer blends are relatively difficult materials to process by the conventional processing techniques, including milling and calendering and extruding. Polyvinyl chloride lubricants are provided in amounts of about 1¼ to 2 parts and preferably about 1.5 parts. Known polyvinyl chloride lubricants include mineral oil, fatty acids, synthetic waxes of the fatty amide and ester types, octyl stearate, calcium stearate, the corresponding citrates and citrate esters, particularly the citrate esters of medium, e.g., starting at about 10 carbon atoms and long-chain carboxylic acids. The glyceride esters and particularly those of the medium and long-chain saturated and unsaturated carboxylic acids and the hydrogenated medium and long-chain carboxylic acids are useful lubricants. Some of these known lubricants and particularly the stearates and citrate esters also have a stabilizing effect and are therefore preferred for at least a portion of the lubricant content of the composition. The preferred lubricants are glycerides, citrates, and hydrogenated carboxylic acids.

Other adjuvants and conventional materials used in polyvinyl plastic compositions, such as ultra-violet stabilizers, coloring agents, pigments, and the like, can be used. The amount of such materials and particularly the pigments is up to about 5 parts and preferably are about 2.5 to 3.5 parts. Titanium dioxide and various organic colors are commonly employed as pigments. Pigments are not necessary when color is not important or colorless (clear) plastics desired.

The preferred compositions of the present invention together with an exemplified composition follows:

| COMPONENTS | Preferred Range (parts) | Preferred Composition (parts) |
|---|---|---|
| PVC homopolymer resin (20,000–23,000) | 100 | 100 |
| impact modifier (methylmethacrylate-butadiene-styrene polymer | 10–14 | 12.0 |
| processing aid (acrylic type)* | 1.5–2.1 | 1.8 |
| lubricant | | |
| blend of olefinic monoglyceride and hydrogenated olein | 1–1.5 | 1.25 |
| tri-stearyl citrate | 0.25–0.35 | 0.3 |
| plasticizer (di-2-ethylhexyl phthalate) | 7.5–8.5 | 8.0 |
| stabilizer boosters | 4–6 | 5.0 |
| epoxidized soybean oil | | |
| mixed di- and tri-nonylphenyl phosphite | 1.25–1.75 | 1.5 |
| polyvinyl alcohol | 0.05–0.08 | 0.0675 |
| stabilizers | | |
| calcium stearate | 0.24–0.30 | 0.27 |
| stannous stearate | 0.37–0.43 | 0.40 |
| zinc stearate | 0.28–0.34 | 0.31 |
| pigments | 2.5–3.5 | |
| rutile grade TiO$_2$ | | 3.25 |
| Hosterperm Red | | 0.0054 |

-continued

| COMPONENTS | Preferred Range (parts) | Preferred Composition (parts) |
|---|---|---|
| Indofast Orange | | 0.0135 |

*Graft terpolymer of methylmethacrylate and butadiene-styrene polymer

The invention is illustrated in the following example. All parts and percentages specified throughout this specification and claims are by weight, unless indicated otherwise.

A polyvinyl chloride composition was prepared having the composition exemplified in the righthand column of the table hereinbefore. The polyvinyl chloride resin and an admixture of the three stabilizers are added gradually to a mixer of the Henschel type, while the mixer is agitating. The resin and stabilizers are added in proportions approximately corresponding to their respective proportions in the exemplified composition in the table. When the desired total quantity of the resin and stabilizers has been added and mixed, the corresponding proportions of the remaining ingredients are added during agitation to prepare a homogeneous mixture. The homogeneous mix is then fed to an extruder and then extruded in the form of a cylindrical solid and cut into small pellets one-eighth inch × three-sixteenths inch. The pellets are then used to form sheet material by being extruded in the form of a rope-shaped material of a diameter about ½ to about 3 inches which is then milled in rollers and calendered into sheet about 15–20 mils thickness. Sections of such sheet were laminated together in a press with a heated die to form sheets about 80–90 mils thick.

Samples of the said plastic sheet of about 80 mils thickness were tested and determined to have an average tensile strength at yield of about 7,550 psi and at rupture of about 3,800 psi. (ASTM D-638.) The average percent elongation at yield was about 5% and the average percent elongation at rupture was 14.2%. The average flexural strength was $10.8 \times 10^3$ psi and the Flexural Modulus was $4.1 \times 10^5$ psi (ASTM D-790.)

This provides a combination of physical properties for the sheet material uniquely suited for orthopedic devices.

The Vicat softening point (ASTM D-1525-70) for the aforesaid plastic layer was 163°F (+ 2° being the usual precision of the test procedure). This is a 5 mil penetration at 136°F up to a 40 mil penetration at 163°F.

When cooled in air from 85°C (185°F), the said sheet of about 80 mils thickness exhibits the relationship between cooling time and the Shore D hardness and temperature set forth in the following table:

| Time (minutes) | Temperature °C | Shore D Hardness |
|---|---|---|
| 0 | 85 | — |
| 1 | 71 | 33 |
| 2 | 61 | 48 |
| 3 | 53 | 62 |
| 4 | 48 | 67½ |

The relatively narrow limits for the various components of the polyvinyl composition of the present invention is determined by the sometimes conflicting requirements of materials necessary to obtain the desired physical properties and also necessary to permit processing into the desired form.

The plastic compositions of this invention are particularly useful in the production of orthopedic devices as disclosed in ELMER ARLUCK's copending application, Ser. No. 465,404, filed Apr. 29, 1974, the disclosure of which is incorporated herein by reference.

We claim:

1. A polyvinyl chloride composition which is formable at temperatures above about 129–130° F and is a shape-retaining solid at ambient temperatures comprising
    100 parts by weight of polyvinyl chloride,
    about 7.5 to 8.5 parts of a polyvinyl chloride plasticizer,
    about 10 to 14 parts of an impact-modifier selected from the group consisting of methylmethacrylate-butadiene-styrene polymer and an acrylonitrile-butadiene-sytrene polymer,
    about 1.5 to 2.1 parts of a polyvinyl chloride processing aid,
    about 1¼ to 2 parts of at least one polyvinyl chloride lubricant,
    about 0.8 to 1.1 parts of at least one polyvinyl chloride stabilizer, and
    about 5 to 8 parts of at least one polyvinyl chloride stabilizer booster containing polyvinyl alcohol.

2. The composition of claim 1 which also contains up to about 5% of pigments and other polyvinyl adjuvants.

3. The composition of claim 2 comprising about 8 parts of said plasticizer, about 12 parts of said impact-modifier, about 1.8 parts of said processing aid, about 1.5 parts of said lubricant, about one part of said stabilizer, about 5.5 to 6.5 parts of said stabilizer booster, and about 2.5 to 3.5 parts of pigment.

4. The composition of claim 3, wherein
    said plasticizer is a phthalate plasticizer,
    said processing aid is an acrylic-type processing aid,
    said lubricant is at least one lubricant selected from the group consisting of glycerides, citrates and hydrogenaged medium and long chain carboxylic acids,
    said polyvinyl chloride stabilizer is at least one metal stearate stabilizer, and
    said stabilizer booster containing polyvinyl alcohol contains at least one compound selected from the group consisting of phosphites, epoxidized oils and polyvinyl alcohol.

5. The composition of claim 4 containing as the metal stearate stabilizers, calcium stearate, stannous stearate, and zinc stearate; and containing as the stabilizer booster, epoxidized soybean oil, mixed di-and-tri-nonylphenyl phosphite, and polyvinyl alcohol.

6. The composition of claim 2, wherein
    said plasticizer is a phthalate plasticizer,
    said processing aid is an acrylic-type processing aid,
    said lubricant is at least one lubricant selected from the group consisting of glycerides, citrates and hydrogenated medium and long chain carboxylic acids,
    said polyvinyl chloride stabilizer is at least one metal stearate stabilizer, and
    said stabilizer booster containing polyvinyl alcohol contains at least one compound selected from the group consisting of phosphites, epoxidized oils and polyvinyl alcohol.

7. The composition of claim 6 containing as the metal stearate stabilizers, calcium stearate, stannous stearate, and zinc stearate; and containing as the stabilizer booster, epoxidized soybean oil, mixed di-and-tri-nonylphenyl phosphite, and polyvinyl alcohol.

8. The composition of claim 2, wherein said polyvinyl chloride has a number average molecular weight of between about 20,000 and 23,000.

9. The composition of claim 5, wherein said polyvinyl chloride has a number average molecular weight of between about 20,000 and 23,000.

10. A polyvinyl chloride composition which is a shape-retaining solid at ambient temperature consisting essentially of 100 parts by weight of polyvinyl chloride having a number average molecular weight of about 20,000 to 23,000,
about 7.5 to 8.5 parts of a phthalate plasticizer,
about 10 to 14 parts of an impact-modifier selected from the group consisting of methylmethacrylate-butadiene-styrene polymer and an acrylonitrile-butadiene-styrene polymer,
about 1 to 1.5 parts of a blend of oleofinic monoglyceride with hydrogenated olein as a lubricant and about 0.25 to 0.35 part of tri-stearyl citrate lubricant,
about 1.5 to 2.1 parts of an acrylic-type processing aid,
about 0.24 to 0.3 part of calcium stearate, about 0.37 to 0.43 part of stannous stearate and about 0.28 to 0.34 part of zinc stearate as the stabilizers,
about 4 to 6 parts of epoxidized soybean oil, about 1.25 to 1.75 parts of mixed di- and tri-nonylphenyl phosphite, and about 0.05 to 0.08 part of polyvinyl alcohol, as the stabilizer boosters, and
about 2.5 to 3.5 parts of pigments.

11. The composition of claim 10, consisting essentially of 100 parts by weight of polyvinyl chloride having a number average molecular weight of about 20,000 to 23,000,
about 8 parts of a di-2-ethylhexyl phthalate,
about 12 parts of methylmethacrylate-butadiene-styrene polymer impact modifier,
about 1¼ parts of a blend of oleofinic monoglyceride with hydrogenated olein as a lubricant and about 0.3 part of tri-stearyl citrate lubricant,
about 1.8 parts of an acrylic-type processing aid,
about 2.7 parts of calcium stearate, about 0.4 part of stannous stearate and about 0.31 part of zinc stearate as the stabilizers,
about 5 parts of epoxidized soybean oil, about 1.5 parts of mixed di- and tri-nonylphenyl phosphite, and about 0.0675 part of polyvinyl alcohol, as the stabilizer boosters, and
about 2.5 to 3.5 parts of pigments.

12. A polyvinyl chloride composition which is formable at temperatures above about 129°–130°F and is a shape-retaining solid at ambient temperatures and which is capable of forming a plastic sheet having the following properties a tensile strength at yield of between 2,000 and 10,000 psi, an elongation at yield of between 3 and 30%, a flexural strength of between 3,000 and 14,000 psi, a flexural modulus of between about $0.5 \times 10^5$ and $7 \times 10^5$ psi, a notched Izod of between 0.3 and 30 foot pounds per inch, a Rockwell hardness of between 15 on the R scale and 55 on the D scale, a Vicat softening point of between 60°C and 80°C, comprising 100 parts by weight of polyvinyl chloride,
about 7.5 to 8.5 parts of a polyvinyl chloride plasticizer,
about 10 to 14 parts of an impact-modifier selected from the group consisting of methylmethacrylate-butadiene-styrene polymer and an acrylonitrile-butadiene-styrene polymer,
about 1.5 to 2.1 parts of a polyvinyl chloride processing aid,
about 1¼ to 2 parts of at least one polyvinyl chloride lubricant,
at least one polyvinyl chloride stabilizer, and at least one polyvinyl chloride stabilizer booster in an amount between about 6 and 9 parts of said stabilizer and stabilizer booster.

13. The composition of claim 12 which also contains up to about 5% of pigments and other polyvinyl adjuvants, and an amount between about 6 and 7.5 parts of said stabilizer and stabilizer booster.

14. The composition of claim 13 comprising about 8 parts of said plasticizer, about 12 parts of said impact-modifier, about 1.8 parts of said processing aid, about 1.5 parts of said lubricant, about one part of said stabilizer, about 5.5 to 6.5 parts of said stabilizer booster, and about 2.5 to 3.5 parts of pigment.

15. The composition of claim 14, wherein
said plasticizer is a phthalate plasticizer,
said processing aid is an acrylic-type processing aid,
said lubricant is at least one lubricant selected from the group consisting of glycerides, citrates and hydrogenated medium and long chain carboxylic acids,
said polyvinyl chloride stabilizer is at least one metal stearate stabilizer, and
said stabilizer booster is at least one compound selected from the group consisting of phosphites, epoxidized oils and polyvinyl alcohol.

16. The composition of claim 15 containing as the metal stearate stabilizers, calcium stearate, stannous stearate, and zinc stearate; and containing as the stabilizer booster, epoxidized soybean oil, mixed di-and-tri-nonylphenyl phosphite, and polyvinyl alcohol.

17. The composition of claim 13, wherein
said plasticizer is a phthalate plasticizer,
said processing aid is an acrylic-type processing aid,
said lubricant is at least one lubricant selected from the group consisting of glycerides, citrates and hydrogenated medium and long chain carboxylic acids,
said polyvinyl chloride stabilizer is at least one metal stearate stabilizer, and
said stabilizer booster is at least one compound selected from the group consisting of phosphites, epoxidized oils and polyvinyl alcohol.

18. The composition of claim 17 containing as the metal stearate stabilizers, calcium stearate, stannous stearate, and zinc stearate; and containing as the stabilizer booster, epoxidized soybean oil, mixed di-and-tri-nonyphenyl phosphite, and polyvinyl alcohol.

19. The composition of claim 18, wherein said polyvinyl chloride has a number average molecular weight of between about 20,000 and 23,000.

20. The composition of claim 12, wherein said polyvinyl chloride has a number average molecular weight of between about 20,000 and 23,000.

* * * * *